(12) United States Patent
Faizan et al.

(10) Patent No.: US 11,536,534 B2
(45) Date of Patent: Dec. 27, 2022

(54) RELAY BASED SYSTEM TO LAUNCH A PROJECTILE

(71) Applicant: Mirza Faizan, Irving, TX (US)

(72) Inventors: Mirza Faizan, Irving, TX (US); Mikaeel Faisal Khan, Murphy, TX (US); Zaynab Khan, Murphy, TX (US); Faraz Rahman, Murphy, TX (US); Mohammed Omer Shakoor, Murphy, TX (US); Ishaq Nadeem Khan, Murphy, TX (US); Shoaib Ali, Garland, TX (US); Bilal Syed Ali Shah, Murphy, TX (US); Mirza Rizwan, Patna (IN)

(*) Notice: Subject to any disclaimer, the term of this patent is extended or adjusted under 35 U.S.C. 154(b) by 0 days.

(21) Appl. No.: 17/185,017

(22) Filed: Feb. 25, 2021

(65) Prior Publication Data

US 2022/0034624 A1 Feb. 3, 2022

Related U.S. Application Data

(60) Provisional application No. 62/982,079, filed on Feb. 27, 2020.

(51) Int. Cl.
*F41B 6/00* (2006.01)
*B64G 1/00* (2006.01)
*H01F 7/06* (2006.01)

(52) U.S. Cl.
CPC ............... *F41B 6/006* (2013.01); *B64G 1/002* (2013.01); *F41B 6/003* (2013.01); *H01F 7/064* (2013.01)

(58) Field of Classification Search
CPC .......... F41B 6/006; F41B 6/003; B64G 1/002; H01F 7/064; H01F 7/20
See application file for complete search history.

(56) References Cited

U.S. PATENT DOCUMENTS

| | | | |
|---|---|---|---|
| 5,915,291 A * | 6/1999 | Weihrauch | F41B 6/003 89/36.01 |
| 10,082,360 B2 * | 9/2018 | Hartman | F41B 6/006 |
| 10,677,559 B2 * | 6/2020 | Davies | F42B 35/00 |

* cited by examiner

*Primary Examiner* — Joshua T Semick

(57) ABSTRACT

A series of the relay of the electromagnetic launcher with a gun and a floating launch platform to launch projectiles in space, wherein the projectile is accelerated along a path using electromagnetic force until the projectile reaches a desired direction and position. The direction of the path is determined by orienting the path in the desired direction using a catcher. the catcher and rail gun projectile as high above as possible, coming close to near space. When the said projectile will reach the last platform, it will be launched by the railgun and ignite its rocket engine to take the payload in space or as required to eliminate the need for large rocket boosters to launch the projectile.

3 Claims, 2 Drawing Sheets

RELAY BASED SYSTEM TO LAUNCH A PROJECTILE

TECHNICAL FIELD

The present invention relates generally to a relay system for launching projectiles in space, and more specifically the invention relates to the relay of the electromagnetic gun and floating launch platforms with the help of which the system launches the projectile in the space.

BACKGROUND OF THE INVENTION

Launching a projectile is one of the most important endeavors in human history. From the launch of the first arrow by a human to today's rocket launches, human civilization has come a long way. Earlier projectile launches used the brute force of human hand, then we slowly advanced to mechanical systems like a catapult and finally to a controlled explosion like that in a gun or even rocket launchers. o launch a projectile to great distances or heights, like in missiles or rockets, we need to add engines to the projectiles and burn lots of fuel to constantly power them towards their destination. Furthermore, to throw a projectile far, we needed to do more powerful explosions, which presents accident hazards.

There was a need for a method to launch projectile higher without using any controlled explosion at high speed, thereby enabling it to go far or high.

For decades, projectile launchers have been popular. One method of launching rockets or projectile has been with the use of solid-fuel rocket engines. These Solid-fuel rocket engines provide ample thrust to launch a rocket Several hundred feet into the air. However, there are many dangers involved with the use of solid fuel engines, and are not cost-effective.

Further conventionally used designed to include a pressure tank in which pressurized air or water is Stored and expelled through a nozzle to propel the projectile.

Another popular method of launching projectiles has been with a launcher which utilizes compressed air behind the rocket to propel it forward. While these rockets do not utilize dangerous Solid fuel-burning engines they typically do not have enough power to propel the rocket to great heights.

An example of a projectile currently available and intended for use in the projectile launching apparatus of the prior art, as well as the invention described herein, is the 40-min cartridge grenade used by the U. 8. Army and other military forces. This 40-mm cartridge includes a self-contained propellant that is ignited by a percussion primer to propel a grenade or other type of projectile.

None of the above inventions and patents, taken either singly or in combination, is seen to describe the present invention as claimed. Thus, a launcher that can propel a projectile Such as a rocket or mines, missiles with a Relay system for launching projectiles in a space, wherein the system uses Electromagnetic Force that solving the aforementioned problems is desired.

Accordingly, there is also a need for a launcher that can propel a projectile Such as a rocket or mines, missiles with great velocity by using a Relay system for launching projectiles in a space, wherein the system uses Electromagnetic Force but without a prolonged burning of fuel. It is to the provision of such therefore that the present invention is primarily directed.

Features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

The present invention addresses the issues as discussed above

SUMMARY OF THE INVENTION

The object of the present invention is to overcome the disadvantages of the prior arts and to provide a relay system to launch projectiles in a space, wherein the relay system consists of one or more Electromagnetic Railgun 10, one or more Projectile 11, one or more Projectile Catcher 12, one or more Stopper Net 13, one or more Arm-Pulley System 14, one or more Large Floating Platform 15, one or more Solar Panels 16, one or more Openable base door 17, one or more Hinge 18, one or more Jolt Sensor 19, one or more Foldable Arm 20, one or more Servo Motor 21, One or more Rocket Engine 22, one or more batteries 23, and one or more Electromagnetic Railgun System.

It is another object of the present invention to provide a relay system for launching the projectile in space, wherein the relay system includes Electromagnetic Railgun typically that uses electromagnetic force to launch high-velocity projectiles. Further, the projectile is available in the Electromagnetic Railgun positioned within the relay system To immerse energy Supplied to the projectile causing a rapid pressure and causes a projectile thereon to be propelled in the space with the help of a series of relay system installed in the space at a predetermined location set by a user.

It is another object of the present invention to provide a relay system for launching the projectile in the space, wherein the relay system includes one or more large and powerful electromagnetic rail gun, wherein the gun is used to launch the projectile. Further, the relay system comprising a helium gas floating platform, where the floating platform comprises a projectile catcher hanging by a pulley system arm. the floating platform is reinforced with a carbon fiber honeycomb structure to give strength to the platform so that it does not burst. Furthermore, the relay system includes solar panels at the top, one or more batteries, and the electromagnetic rail gun system inside the relay system.

As according to another object of the invention, the relay system includes a plurality of helium gas floating platform, wherein the helium gas floating platform includes the electromagnetic rail gun to launch the projectile from one platform to the other platform, wherein the other platform also comprises electromagnetic rail gun to transfer the projectile to another platform.

According to the position, where the projectile to be launched, one or more helium gas floating platforms can be installed in the relay system.

With the above and other objects in view, as will hereinafter appear, another object of the feature of the present invention is the provision of a relay system with a plurality helium gas floating platform for launching projectile in the space.

With the above and other objects in view, as will hereinafter appear, the relay system further comprises a rocket engine, wherein the rocket engine is used to launch the projectile to space.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention Other objects, advantages, and features of this invention will become more apparent from the following description.

The details of one or more implementations are set forth in the accompanying description below. Other aspects, features, and advantages of the subject matter disclosed herein will be apparent from the description and the claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

Figure 1:
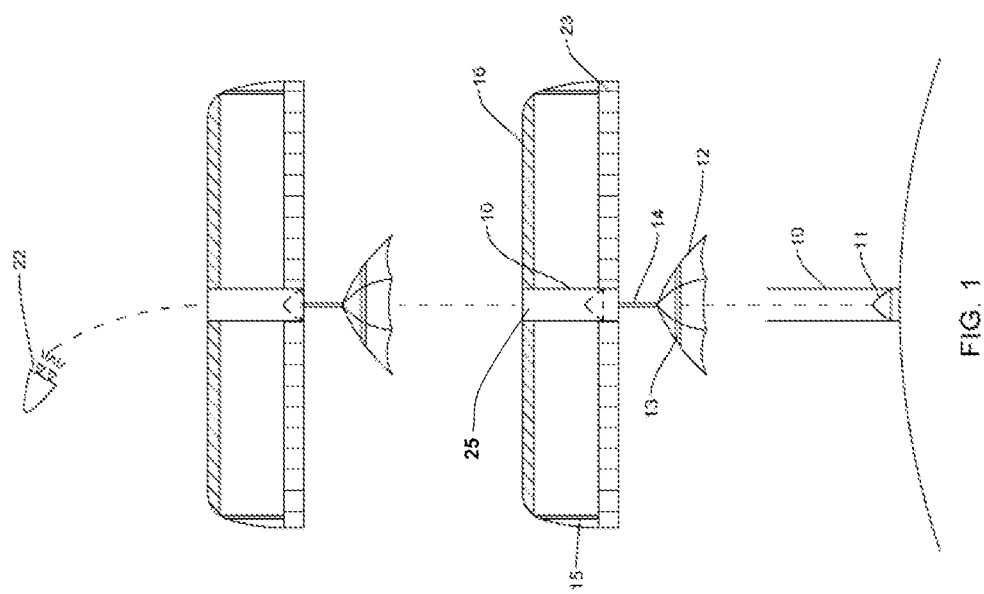

The following figure depicts a certain illustrative embodiment of the invention. This depicted embodiment is to be understood as illustrative of the invention and not as limiting in any way.

Figure 2:
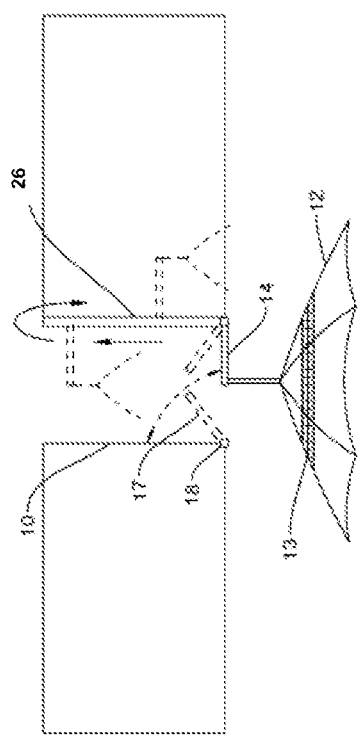
Figure 3:
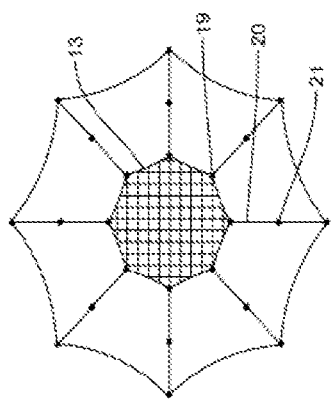

Referring particularly to the drawing for illustration only and not limitation, there is illustrated:

FIG. 1 shows an overall view of the relay launch system as according to the present invention;

FIG. 2 shows a close-up view of the projectile catcher deployment mechanism as according to the present invention; and FIG. 3 shows a close-up view of the projectile catcher according to the present invention.

DRAWINGS—REFERENCE NUMERALS

10 Electromagnetic Railgun
11 Projectile
12 Projectile Catcher
13 Stopper Net
14 Arm-Pulley System
15 Large Floating Platform
16 Solar Panels
17 Openable base door
18 Hinge
19 Jolt Sensor
20 Foldable Arm
21 Servo Motor
22 Rocket Engine
23 Batteries and Electromagnetic Railgun System
24 Floating platform propellers

DETAILED DESCRIPTION OF DRAWINGS

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "an embodiment," "at least one embodiment," "one example," "an example," "for example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Embodiments of the present invention solve the above-mentioned problems and provide a distinct advance in the art of electromagnetic rail guns for projectile launchers. A relay system constructed in accordance with embodiments of the invention may be particularly advantageous in applications that require high speeds and low power consumption and that must fit into a small space and may also aid in the development of series of electromagnetic gun rail for projectile launchers.

An embodiment of the invention is an electromagnetic launcher having a large helium gas floating platform, wherein the platform includes a projectile catcher hanging by a pulley system arm for providing a pathway, for receiving and accelerating a projectile. The shape and configuration of the platform allow the projectile to stay within the launcher and transfer to the other platform, thus achieving higher speeds without requiring a longer length. The projectile accelerates along the guideway by way of an electromagnetic force. Specifically, the launcher includes conductive coils in or around the platform that may be electrically connected to a power supply to create an electromagnetic field along with the platform.

FIG. 1 shows the overall view of the present invention. The relay system of the present invention consists of a large and powerful electromagnetic rail gun 10, wherein the railgun is loaded with a projectile 11 which is to be launched. The relay system includes a large helium gas floating platform 15, wherein the platform includes a projectile catcher 12 hanging by a pulley system arm 14.

According to an embodiment of the invention, the floating platform includes a plurality of battery-powered propellers 24 to move the platform horizontally.

According to another embodiment of the present invention, the electromagnetic launcher may further include a pair of rails having a positive rail and a negative rail that is positioned along the pathway and two pairs of connectors.

According to an embodiment of the invention, an inner side of the projectile catcher 12 includes a stopper net 13, to catch the projectile, launched from the below electromagnetic rail gun 10 of the other helium gas floating platform 15, wherein the projectile catcher 12 includes a plurality of foldable arms to catch projectile between the foldable arms of projectile catcher 12.

According to an embodiment of the present invention, the pathway 25 may be a channel, such as a hollow tube, having a closed-loop. The pathway 25 may be comprised of strong, non-conducting material, such as concrete, plastics, carbon fiber, ceramic (material), fiberglass, or other non-magnetic materials, depending on the application.

The pathway 25 may include one or more walls configured to partially or surround the projectile placed therein. The pathway 25 may be in the shape of a toroid, circle, oval, or another closed-loop shape, such as a figure eight or an infinity symbol shape.

In some embodiments of the invention, the projectile may be at least partially cylindrically shaped with a radius smaller than the radius of the pathway so that the projectile travels within the pathway 25.

The said floating platform has solar panels 16 at the top and batteries and electromagnetic rail gun system 23 inside it.

FIG. 2 shows a close-up view of the projectile catcher deployment mechanism on the floating platform. The projectile catcher is hanging through a pulley system arm 14. The base of electromagnetic rail gun 10 has an openable base door 17 which opens towards inside through hinge 18 to bring the catcher and projectile inside the barrel of the said rail gun. The pulley system arm 14 can move around the barrel of said rail gun 10 with the help of Gear based system 22 to come back and deploy again at the base of the rail gun.

FIG. 3 shows a close-up view of the inner side of the projectile catcher. It has an umbrella-type structure with various foldable arms 20. These arms have a joint with servo motor 21. There is a stopper net 13 tied to said arms. The net is connected to said foldable arms 20 through a jolt sensor 19.

FIG. 1 shows the overall view of the present invention. The present invention consists of a large and powerful electromagnetic rail gun 10 which is used to launch the projectile 11. There is a very large helium gas floating platform 15 which a projectile catcher 12 hanging by a pulley system arm 14. Said floating platform is reinforced with a carbon fiber honeycomb structure to give strength to the platform so that it does not burst. The said floating platform has solar panels 16 at the top and batteries and electromagnetic rail gun system 23 inside it.

When the projectile is launched, its guidance system guides it towards the projectile catcher 12. The inner side of projectile catcher 12 has a stopper net of 13 weavers between arms of projectile catcher 12. When the projectile hits the net, it activates the jolt sensor 19 which in turn sends a signal to servo motors to close the arm, thus catching the projectile. The floating sensor is kept at a pre-calculated height using classical mechanics formula $V^2=U^2+2gS$, where V is the final velocity of the projectile, U is the initial velocity of the projectile (zero in this case), 'g' is the acceleration due to gravity and 'S' is the distance covered or height the projectile may reach. This formula gives a very accurate height at which we may need to station the said platform so that by the time the projectile reaches the catcher, its velocity is almost zero and it does not damage anything on the platform.

According to the present invention, the series or relay of the electromagnetic launcher with a gun and a floating launch platforms to launch projectiles in space, wherein the projectile is accelerated along a path using electromagnetic force until the projectile reaches a desired direction and position. The direction of the path is determined by orienting the path in the desired direction using a catcher. the catcher and rail gun projectile as high above as possible, coming close to near space. When the said projectile will reach the last platform, it will be launched by the railgun and ignite its rocket engine to take the payload in space or as required to eliminate the need for large rocket boosters to launch the projectile.

According to an embodiment of the invention, the Electromagnetic launchers comprises conductive coils 26 that converts electrical energy into mechanical propulsion to launch objects such as missiles, aircraft, space crafts, and other projectiles. Velocities provided by electromagnetic launchers may exceed the velocities provided by other propulsion methods (chemical, mechanical, pneumatic, etc.).

FIG. 2 shows a close-up view of the projectile catcher deployment mechanism on the floating platform. The projectile catcher is hanging through a pulley system arm 14. The base of electromagnetic rail gun 10 has an openable base door 17 which opens towards inside through hinge 18 to bring the catcher and projectile inside the barrel of the said rail gun. The pulley system arm 14 can move around the barrel of said rail gun 10 with the help of Gear based system 22 to come back and deploy again at the base of the rail gun.

There are a series of such floating platforms with catcher and rail gun to relay the projectile as high above as possible, coming close to near space. When the said projectile will reach the last platform, it will be launched by the railgun and ignite its rocket engine to take the payload in space or as required. Thereby eliminating the need for large rocket boosters to launch a satellite.

In another embodiment of the present invention, projectiles may contain securely packed goods which may be launched using this system and catcher mechanism to store inventories on a floating warehouse.

According to another embodiment of the invention, depending on the length of the electromagnetic rail gun, this invention may be used to launch various projectiles like a missile and even sending satellites in space at a fraction of cost, since it will eliminate the need for initial stage rockets.

According to another embodiment of the invention, the projectile includes an engine to launch the projectile to further height.

The invention is therefore based on the object to develop the relay system of the present invention consists of a large and powerful electromagnetic rail which permits a low-noise, cost-effective, launching of projectiles and missiles.

According to an embodiment of the invention, the control unit includes a processor or controller and memory.

It is recognized, however, that departures may be made within the scope of the invention and that obvious modification will occur to a person skilled in the art. With respect to the above description then, it is to be realized that the optimum dimensional relationships for the parts of the invention, to include variations in size, materials, shape, form, function, and manner of operation, assembly, and use, are deemed readily apparent and obvious to one skilled in the art, and all equivalent relationships to those illustrated in the drawings and described in the specification are intended to be encompassed by the present invention.

It is therefore submitted that the instant invention has been shown and described in what is considered to be the most practical and preferred embodiments. It is recognized, however, that departures may be made within the scope of the invention and that obvious modification will occur to a person skilled in the art. With respect to the above description then, it is to be realized that the optimum dimensional relationships for the parts of the invention, to include variations in size, materials, shape, form, function, and manner of operation, assembly, and use, are deemed readily apparent and obvious to one skilled in the art, and all equivalent relationships to those illustrated in the drawings and described in the specification are intended to be encompassed by the present invention.

It is noted that various connections are set forth between elements in the description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read-Only Memory (ROM). The computer system further comprises a storage device, which may be a hard-disk drive or a removable storage drive, such as, a floppy disk drive, optical disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as the reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, "C," "C++," "Visual C++," Java, and "Visual Basic." Further, the software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various implementations of the systems and techniques described here can be realized in digital electronic circuitry, integrated circuitry, specially designed ASICs (application-specific integrated circuits), computer hardware, firmware, software, and/or combinations thereof. These various implementations can include implementation in one or more computer programs that are executable and/or interpretable on a programmable system including at least one programmable processor, which may be special or general-purpose, coupled to receive data and instructions from and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus, and/or device (e.g., magnetic discs, optical disks, memory, Programmable Logic Devices (PLDs)) used to provide machine instructions and/or data to a programmable processor.

A person having ordinary skills in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create other different systems or applications.

While in the foregoing specification, several embodiments of the invention have been set forth for purposes of making a complete disclosure, it will be apparent to those skilled in the art that numerous changes may be made without departing from the spirit and principles of the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although the present invention has been explained in relation to its some embodiments, it is to be understood that many other possible modifications and variations can be made without departing from the Spirit and Scope of the invention as hereinafter claimed.

What is claimed is:

1. A relay system for launching a projectile, comprising:
an electromagnetic rail gun;
a helium gas floating platform with a projectile catcher, wherein the projectile catcher comprises a stopper net between arms of the projectile catcher, and wherein the projectile catcher is configured to catch the projectile from the electromagnetic rail gun using the stopper net;

the helium gas floating platform comprising a pathway for retaining a projectile therein, wherein the pathway is made of non-conductive material; and a plurality of conductive coils embedded in the pathway, wherein the conductive coils are operable to be electrically connected to a power supply, such that the power supply provides an electric current to the conductive coils creating an electromagnetic field along the pathway for accelerating the projectile within the pathway.

2. The Relay system for launching projectiles of claim 1, wherein the pathway comprises a door openable when the projectile within the pathway reaches a critical speed, and wherein the catcher of the helium gas floating platform catches the projectile through the door.

3. The Relay system for launching projectiles of claim 1, further comprises one or more solar panels.

* * * * *